United States Patent
Diveley et al.

(10) Patent No.: US 7,315,843 B2
(45) Date of Patent: * Jan. 1, 2008

(54) ELECTRONIC IDENTIFIER PAYMENT SYSTEMS AND METHODS

(75) Inventors: Keith W. Diveley, Highlands Ranch, CO (US); Kurt Hansen, Castle Rock, CO (US)

(73) Assignees: The Western Union Company, Englewood, CO (US); First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/479,142

(22) Filed: Jun. 30, 2006

(65) Prior Publication Data

US 2007/0022049 A1    Jan. 25, 2007

Related U.S. Application Data

(63) Continuation of application No. 10/007,701, filed on Dec. 10, 2001, now Pat. No. 7,158,955, which is a continuation-in-part of application No. 09/990,702, filed on Nov. 9, 2001, now Pat. No. 7,092,916, which is a continuation-in-part of application No. 09/823,697, filed on Mar. 31, 2001, now Pat. No. 7,165,052.

(51) Int. Cl.
*G06Q 99/00* (2006.01)

(52) U.S. Cl. .......................... 705/40; 705/41; 705/43; 705/64; 705/26; 235/375; 235/376

(58) Field of Classification Search ................. 705/40, 705/41, 43, 64; 235/375, 376
See application file for complete search history.

(56) References Cited

U.S. PATENT DOCUMENTS

| | | | |
|---|---|---|---|
| 7,158,955 B2 * | 1/2007 | Diveley et al. | 705/74 |
| 2002/0049670 A1 * | 4/2002 | Moritsu et al. | 705/40 |
| 2007/0100746 A1 * | 5/2007 | Blair et al. | 705/39 |

FOREIGN PATENT DOCUMENTS

JP        411203560 A   *  7/1999

* cited by examiner

*Primary Examiner*—Pierre Eddy Elisca
(74) *Attorney, Agent, or Firm*—Townsend and Townsend and Crew LLP

(57) ABSTRACT

A payment service method and system involve a payment service provider, a customer/payor and a consumer provider/payee. The customer/payor enrolls in the service and is provided a unique identifier that enables the customer to conduct transactions with the payment service provider. The customer/payor interfaces with the payment service provider through various forms of communication, and can facilitate payments to the consumer providers/payees through the payment service provider while remaining anonymous.

16 Claims, 17 Drawing Sheets

BLOCK DIAGRAM

PAYMENT
FLOW CHART

*CLIENT CUSTOMER BASE ENROLLMENT*

PAYMENT PARAMETERS

*DYNAMIC CLIENT/ CUSTOMER INTERFACE*

*ADVERTISING/COUPON ON RECEIPT*

AUTOMATIC REPEAT CUSTOMER DISCOUNT

*TRANSACTION METERING*

CLIENT REBATE

*ALTERNATIVE PAYMENT METHODS*

ADDITIONAL
PRODUCT
SUPPORT

CLIENT-SPECIFIC ENROLLMENT

ELECTRONIC IDENTIFIER PAYMENT SYSTEMS AND METHODS

CROSS-REFERENCES TO RELATED APPLICATIONS

This application is a continuation of U.S. patent application Ser. No. 10/007,701 filed Dec. 10, 2001, now U.S. Pat. No. 7,158,955 which is a continuation-in-part of U.S. patent application Ser. No. 09/990,702 filed Nov. 9, 2001 (U.S. Pat. No. 7,092,916), which is a continuation in part of U.S. application Ser. No. 09/823,697, filed March 31, 2001, now U.S. Pat. No. 7,165,052 the complete disclosures of which are herein incorporated by reference.

BACKGROUND OF THE INVENTION

The present invention relates generally to financial transaction systems and methodologies, and in particular to methods and systems for making payments based on a customer identification.

A wide variety of payment methods are available to consumers of goods and services. In addition to currency, consumers are often able to use their credit in making purchases. A common system for making credit purchases involves the use of a credit card provided by a credit card issuer, such as a commercial bank or other financial institution. Non-credit transactions can be handled by debit cards, which utilize funds already deposited by the consumer for payment purposes.

Many types of payment methodologies are dependent upon customers having relationships with financial institutions such as banks, credit unions, etc. However, a substantial percentage of consumers do not use such conventional financial institutions. These consumers are often referred to as "unbanked" because they do not maintain accounts with such institutions. Unbanked consumers are often inconvenienced in making financial transactions. For example, without bank accounts, they experience difficulty and inconvenience in obtaining negotiable instruments, making purchases on credit, etc.

Recently there have been a number of new products which provide at least partial solutions to the problems of the unbanked and other consumers. For example, "prepay" cards allow consumers to pre-purchase various goods and services. An important example relates to the use of telecommunications services, which are available through prepaid "calling cards". Many consumers prepay on a monthly basis for "dial tone" service. Prepaid cards can also be reloadable whereby additional value can be added by consumers for using their cards indefinitely.

Another prior art payment system involves the use of payment service providers making payments on behalf of consumers over the Internet global computer network or by negotiable instrument. Such a payment service is available from Western Union Commercial Services under its trademark QUICK COLLECT. This product allows consumers to make payments to Western Union agents who then transfer funds either over the Internet global computer network or issue negotiable instruments to the payees on behalf of the customers/payors. The customers submit certain identifying information each time they use this service.

In one aspect, the present invention addresses the need for a payment service method and system which allow customers to gain access to the service simply by providing an identifier. For example, the payment service provider can issue the customers cards adapted for swiping to input their identifiers. A payment service is also needed which substantially instantaneously credits payments to accounts as directed by the customer. For example, customers who purchase prepaid dial tone telecommunications services often intend to use such services immediately.

In another aspect, there is also a need for a payment service provider to retain customer information to facilitate making a payment by simply swiping a card to input the customer's ID and designating a payment amount. Enrolled customers can thus remain in the system's database indefinitely for use of the payment service on demand.

BRIEF SUMMARY OF THE INVENTION

In one embodiment, the invention enables a payment service provider to contract with its clients (consumer providers) to facilitate payments and prepayments made by customers or consumers for goods or services offer by the consumer provides. The customers may interface with the payment service provider through any one of a number of different interfaces. A unique identifier is assigned to each customer and may comprise of any suitable character string or similar unique identifier. For example, customers using the payment service to prepay for phone time may utilize their telephone numbers as their identifiers. Commercial clients may pre-enroll their customer databases with the payment service provider. The payment service provider requests the identifier from each customer when ready to pay for a good or service. The identifier is used to access information from the customer database. The payment service provider, or its agents, receives payment from the customer and produces a record of payment. The payment information along with the payment may then be electronically transmitted to the consumer service provider.

In one embodiment, a method for prepaying for goods and services proceeds by having a consumer provider that is to provide the goods or services transmit a set of identifiers to a payment service provider. Conveniently, these identifiers may be sent to a host computer of payment the service provider. When a consumer is ready to receive a good or service, the consumer provider is contacted and the consumer is issued one of the identifiers. The consumer then contacts the payment service provider, gives the identifier, and makes the payment. This information may be entered into a terminal so that an electronic record may be made and transmitted to the host. The payment information may also be sent to the consumer provider and a wire transfer of the payment made to the bank account of the consumer provider. The consumer may contact the consumer provider and give the identifier to receive the good or service. This step may also occur automatically since payment information may be sent from the host to the consumer provider.

In one aspect, when the consumer provides the identifier, it may be used to call up a screen on the terminal with the account information. Optionally, the host may communicate with a database to calculate any applicable taxes. This tax information may be sent to the terminal so that taxes may be paid as well. The payment and taxes may be sent to the consumer provider to facilitate payment of taxes by the consumer provider. The payment service provider may also collect a fee for its service.

Such a method is useful in paying for a variety of goods and services. For example, the method may be used for service activation (such as phone service), for adding time to a cell phone, or the like. When related to phone service, the payment information may be sent from the host to a phone switch to almost instantaneously activate a service or add time to a phone.

As another example, the method may be used to pay for items offered for sale over the media, such as the television. For instance, when viewing an item for sale, the consumer may call a phone number to request a purchase. To make payment, the consumer may be given an identifier so that payment may be made as previously described. Once payment is made, the order is fulfilled and shipped.

In another aspect, the consumer is issued a receipt upon presentment of the payment to the payment service provider. The receipt includes the identifier so that the consumer has a record of the identifier to present to the consumer provider.

In some cases, the consumer is not required to enroll with the consumer provider in order to make a payment or receive a service. For example, the consumer provider may issue a set of identifiers to a payment service provider. These identifiers are associated with some type of good or service, such as phone time, a stored value, or the like. When payment is made, the consumer is issued an appropriate identifier that is redeemable for the good or service. For instance, the consumer may contact a phone company to request time be added to a phone account. As another example, the identifier may be presented to a retailer or to a web site to purchase a good. The consumer's stored value account is then debited by the amount of purchase.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
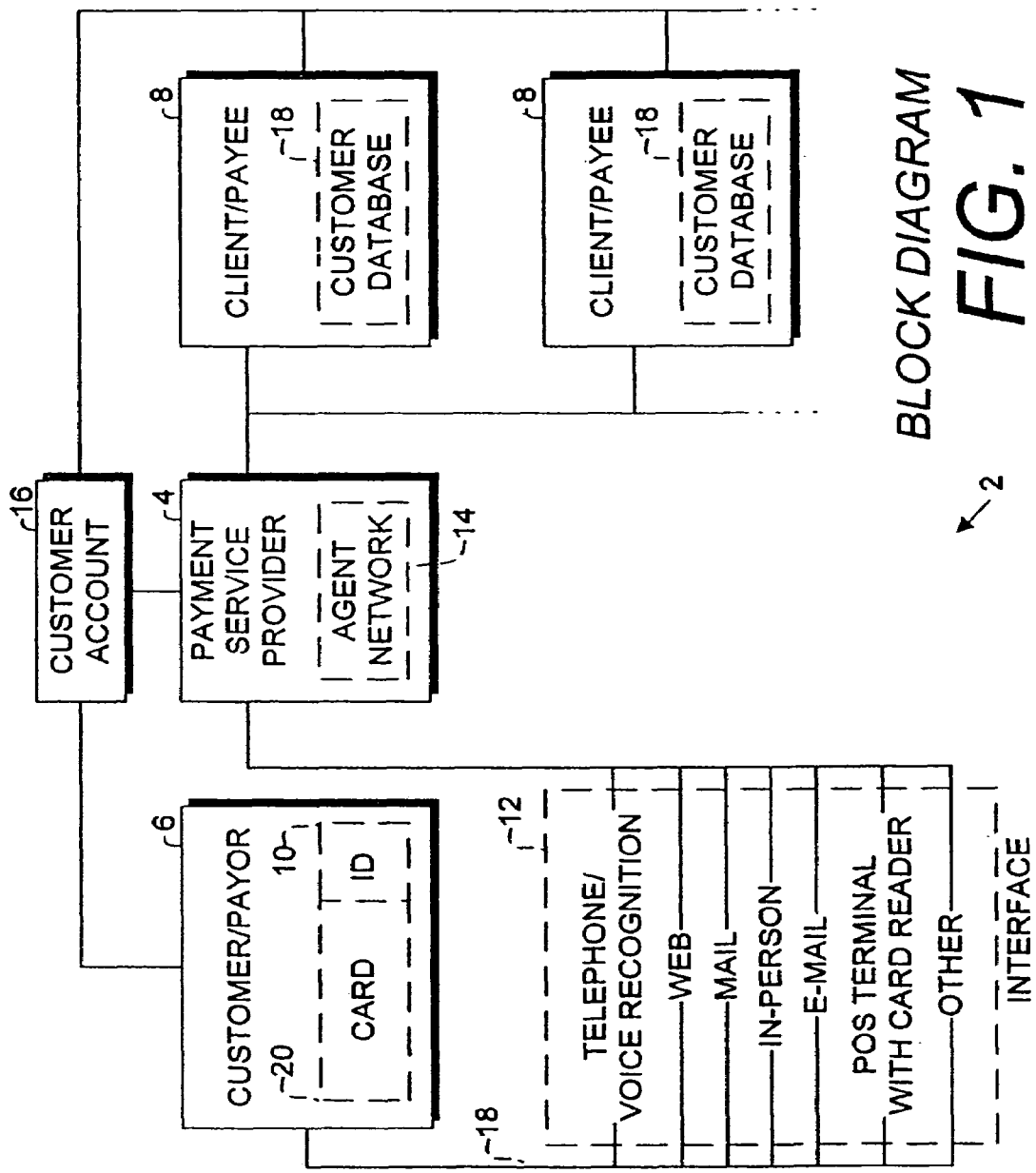
FIG. 1 is a block diagram of a payment service system embodying the present invention.

Referring the drawings in more detail, the reference numeral 2 generally designates a payment system embodying the present invention. As shown in the block diagram FIG. 1, the system 2 includes a payment service provider 4 for facilitating payment from a customer/payor 6 to one or more clients/payees 8.

Each customer/payor has a unique ID 10, which can comprise any suitable identifier. Conventional identifiers such as name, social security number, PIN, etc. are acceptable. Moreover, the system 2 can accommodate anonymous customers/payors 6. Such customers 6 can maintain their anonymity by creating their own IDs 10. The ID 10 can also comprise the customer's telephone number. Thus, the system 2 can be used for paying for telephone services using only the customer's telephone number for identification purposes. The customer in this model does not even have to provide an address or any other personal information. Similar identification arrangements could be used with other clients 8, i.e. accepting payments on accounts with the customers identified by their respective account numbers. The customer 6 interfaces with the payment service provider 4 through an interface 12. The interface 12 can comprise any suitable form or device for communications, including telephone (which can incorporate voice recognition (VR)), worldwide web (Internet), mail, in-person, a point-of-sale (POS) terminal with a card reader, e-mail or any other suitable interface. Examples of POS terminals that may be used are described in copending U.S. patent application Ser. No. 09/634,901, entitled "POINT OF SALE PAYMENT SYSTEM," filed Aug. 9, 2000 and U.S. Prov. Appl. No. 60/147,899, entitled "INTEGRATED POINT OF SALE DEVICE," filed Aug. 9, 1999, the complete disclosures of which are herein incorporated by reference.

The payment service provider 4 can include an agent network 14 which can provide point-of-sale (POS) contact points system-wide for convenient in-person accessibility by the customers 6. The payment service provider 4 maintains customer accounts 16 which can correspond to the clients/payees 8. Each client/payee can have associated therewith a customer database 18 containing pertinent information regarding the customers 6 and their respective accounts 17. The designation of accounts, subaccounts, master accounts, etc. can vary from client-to-client. Thus, as used herein the terms account, subaccount and similar terms can designate either the entire account base of a particular client 8, or the individual account of a customer(s) 6.

In one embodiment, agent network comprises a host computer that may be accessed by a variety of remote computers or other devices, such as those described in connection with interface 12. For example, the host computer may comprise a mainframe computer, a server computer or the like. A database may also be associated with the host computer. In this way, information from customer databases 18 may be transmitted to the host computer and stored in the database. When a customer contacts agent network 14, it may be through the host computer. Hence, with this configuration, a customer may proceed with a transaction using interface 12 which contacts the host computer of agent network 14 to receive customer information, such as the unique identifier, and to transmit payment information back to the host. The host computer may also serve to coordinate a wire transfer of the payment to a bank account of the payee 8 as well as to transmit payment information to a computer system of payee 8. Electronic finds transfers may conveniently be made through an automated clearing house (ACH) system that is contacted by the host computer. ACH transfers are well known within the art and will not be described further.

Figure 2:
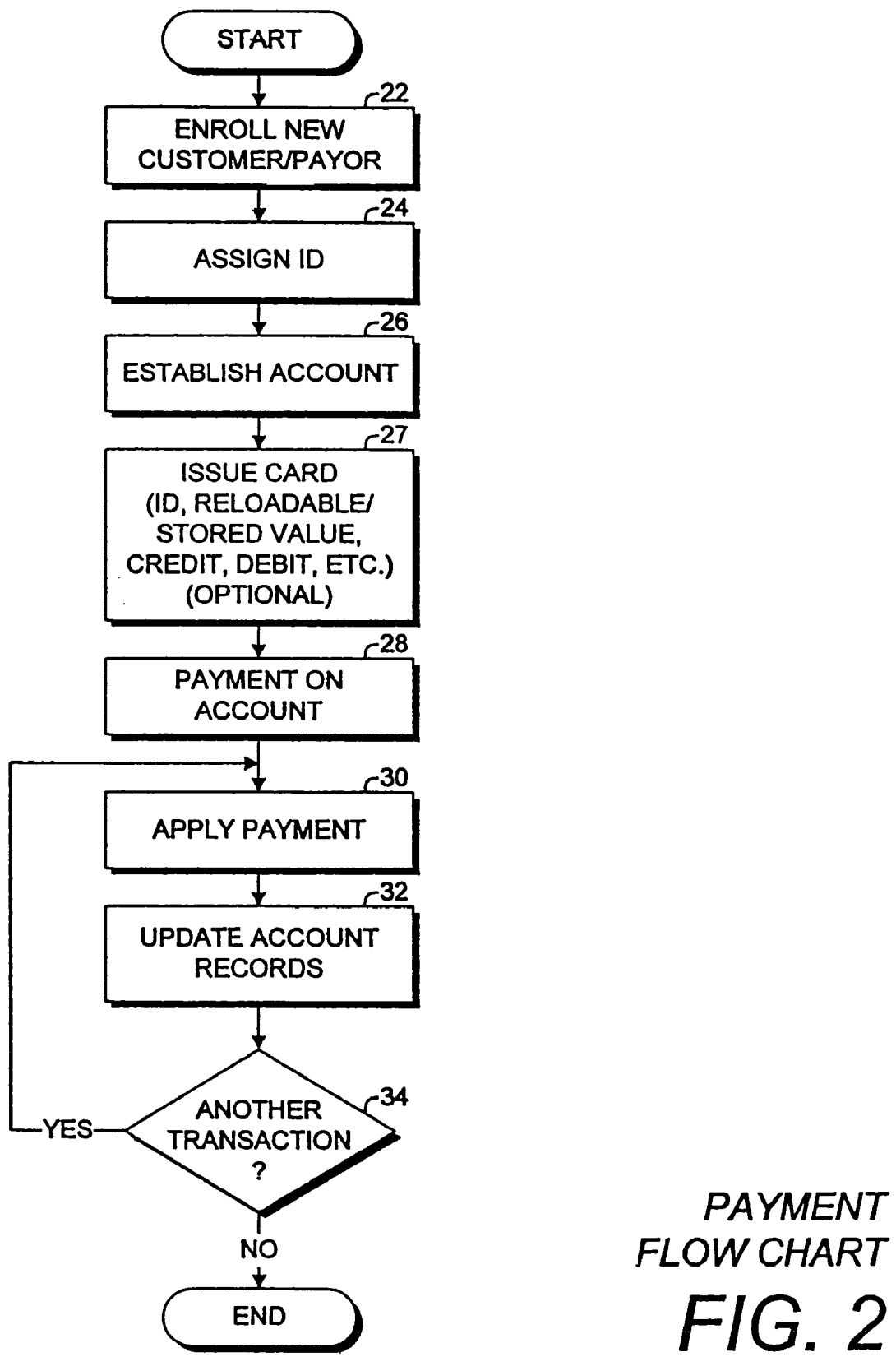
FIG. 2 is a flow chart for payments made in accordance with the method of the present invention.

In the methods illustrated in FIGS. 2-13, it will be appreciated that the flow of data between the customer/payor 6, the payment service provider 4, and the clients/payees 8 may occur using the system described above. FIG. 2 is a payment flow chart depicting a payment method which commences with the enrollment of a new customer/payor at 22 followed by an ID 10 that is assigned at 24. An account 17 is established with the payment service provider 4 at 26. Optionally a card 20 can be issued to the customer 6 at 27. The card 20 can comprise an ID card, a reloadable/stored value card, a credit card, a debit card, etc. Any suitable card configuration can be utilized. For example, preprinted cards with concealed customer IDs 10 can be inventoried with the agent network 14 for distribution upon enrollment. However, the system 2 can function without any cards whatsoever simply by assigning unique customer IDs 10 for purposes of conducting all payment transactions. A payment is made on the account at 28. The payment is applied at 30 and the subaccount records are updated at 32. A decision is made at a decision box 34 if another transaction is to be conducted. If so, the process returns to the payment application step 30 whereby the customer's payment can be applied to another account. If not, the process ends.

Figure 3:
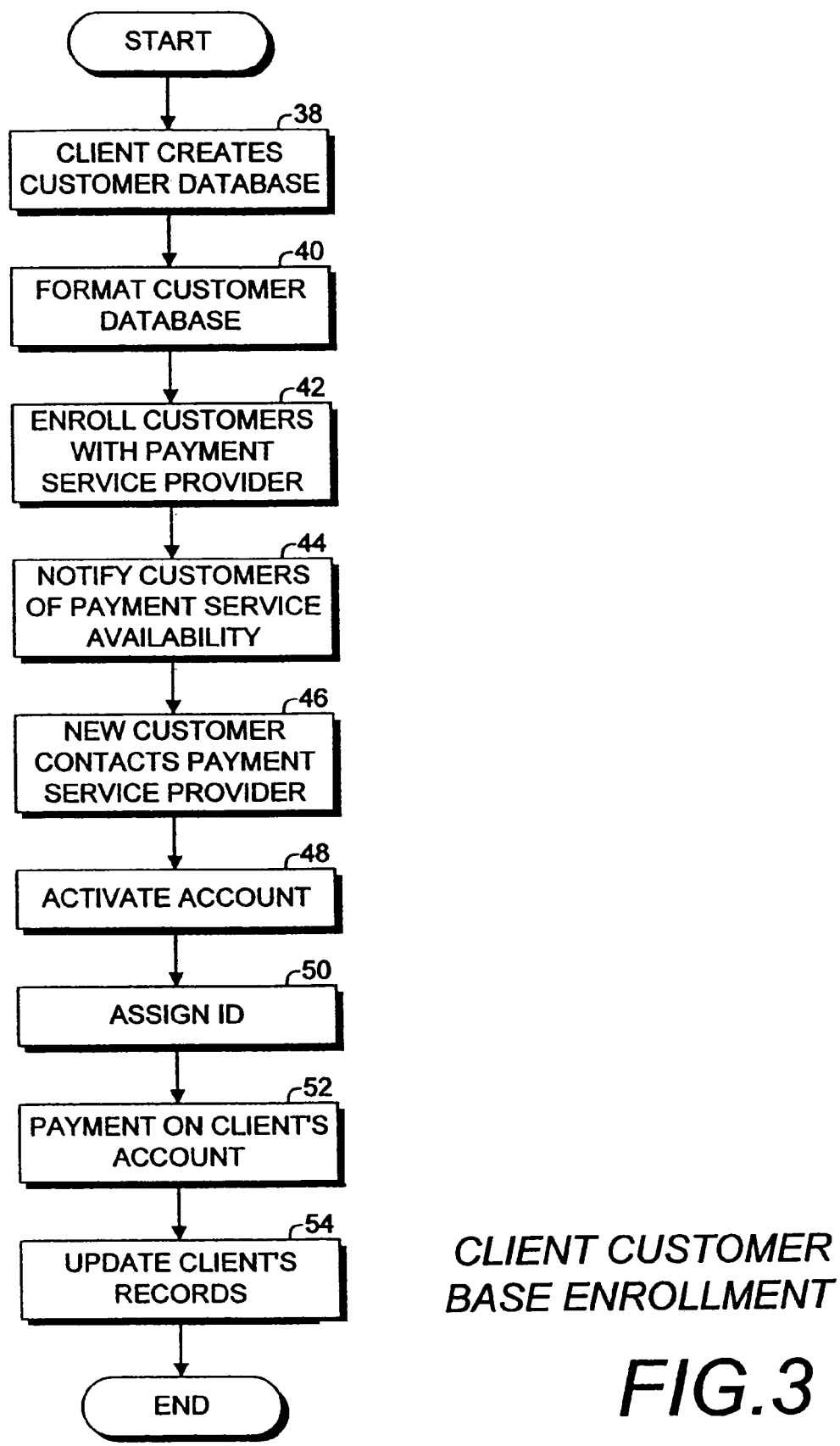
FIG. 3 is a flow chart for enrolling customers.

FIG. 3 shows a method of enrolling the customer base of a client 8 including the step of the client creating a customer database at 38. At 40 the database is formatted, preferably pursuant to the standards established by the payment service provider 4 to facilitate automation of the payment process. All of the customers 6 in the client's customer database can automatically be enrolled in the payment service at 42. The customers 6 can be notified of the payment service availability at 44, whereupon the new customer can contact the payment service provider 4 at 46 and activate the account at 48. The customer ID 10 is assigned at 50, the customer makes a payment on a client's account at 52 and the client's records are updated at 54.

Figure 4:
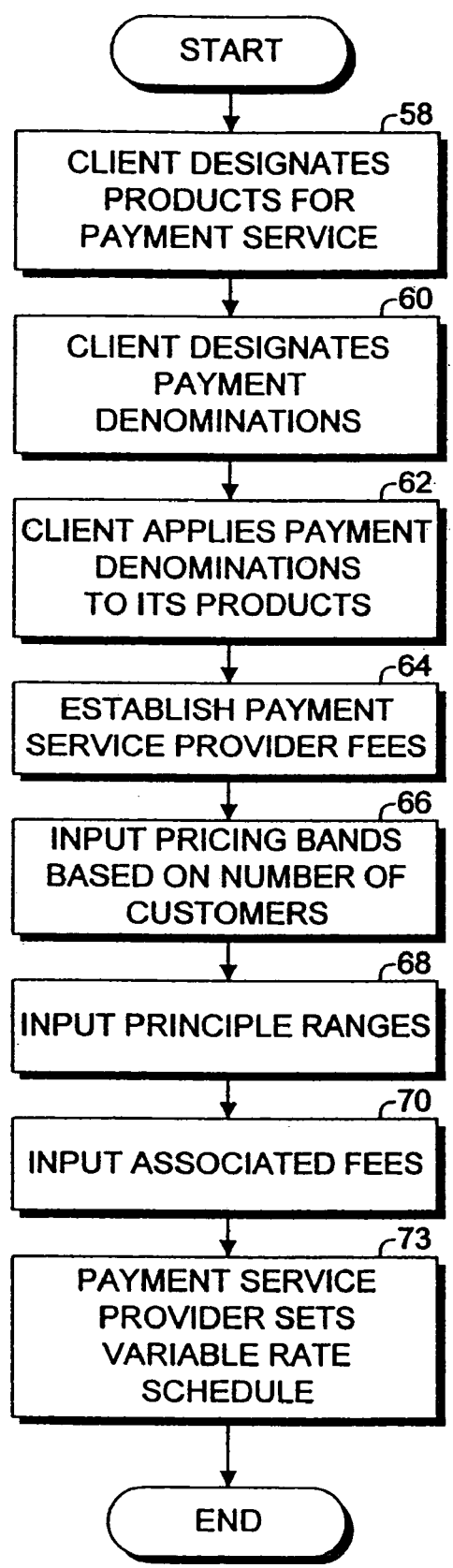
FIG. 4 is a flow chart for implementing payment parameters.

FIG. 4 shows a methodology for establishing payment parameters. At 58 the client designates the products for payment service. The system and method can accommodate clients with multiple products by allowing flexibility in establishing the payment parameters for each and by accommodating different payment directions from customers 6 on the various products. The client designates its payment denominations (e.g. $5, $10, $20, etc. increments) at 60 and applies the payment denominations to its products at 62. The payment service plan can optionally be configured to accept exact payments of any amount without applying predetermined payment denominations. Payment service provider fees are established at 64. The fees can reflect the nature of the clients' accounts. For example, payment bands can be input at 66 wherein various bands are applicable according to the number of customers. Pricing can also be based on the ranges of principle payment amounts at 68. The fees associated with the transactions are input at 70. The payment service provider 4 can set a variable fee schedule, taking into account factors such as pricing, principle and fee bands and ranges at 72.

Figure 5:
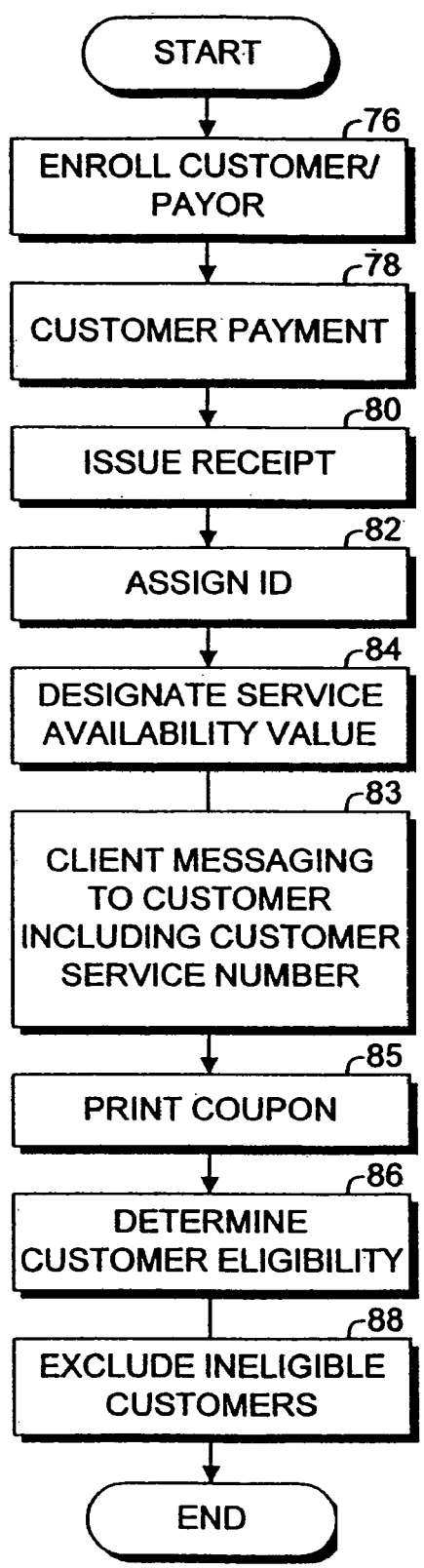
FIG. 5 is a flow chart for a dynamic client/customer interface.

FIG. 5 shows a dynamic client/customer interface methodology wherein the customer enrolls with the payment service provider at 76, makes a payment at 78 and is issued a receipt at 80. The customer is assigned an ID at 82. Client messaging to the customer is communicated at 83 and can include the customer service number. The value of the available payment service is designated at 84. A coupon is printed at 85 for eligible customers 6. Customer eligibility is determined at 86 and ineligible customers are excluded at 88.

Figure 6:
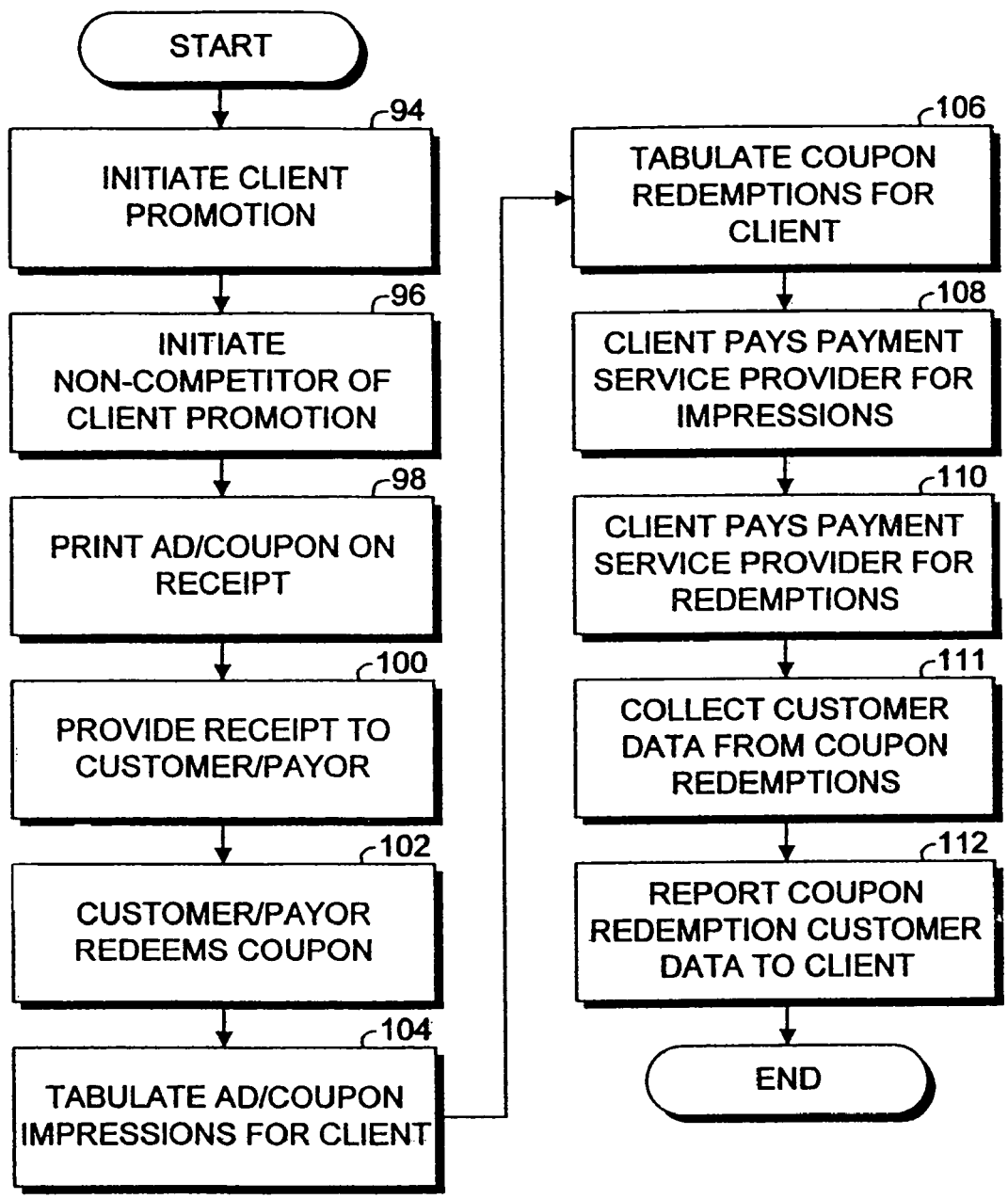
FIG. 6 is a flow chart for providing advertising and coupons on receipts for payments.

FIG. 6 shows an optional methodology for utilizing the customers' receipts for advertising and coupons. A client promotion is initiated at 94. Alternatively, a promotion can be initiated for a non-competitor of the client at 96. At 98 the advertising or coupons are printed on the receipts, which are provided to the customers at 100. The customers 6 can redeem the coupons at 102. At 104 the advertisement and coupon impressions are tabulated for each client and the coupon redemptions are tabulated at 106. The client pays the payment service provider at 108. Based on tabulated redemptions, the client can also pay the payment service provider at 110. Customer data is collected from the coupon redemptions at 111. The customer data can be manipulated in various ways and reported to the client at 112.

Figure 7:
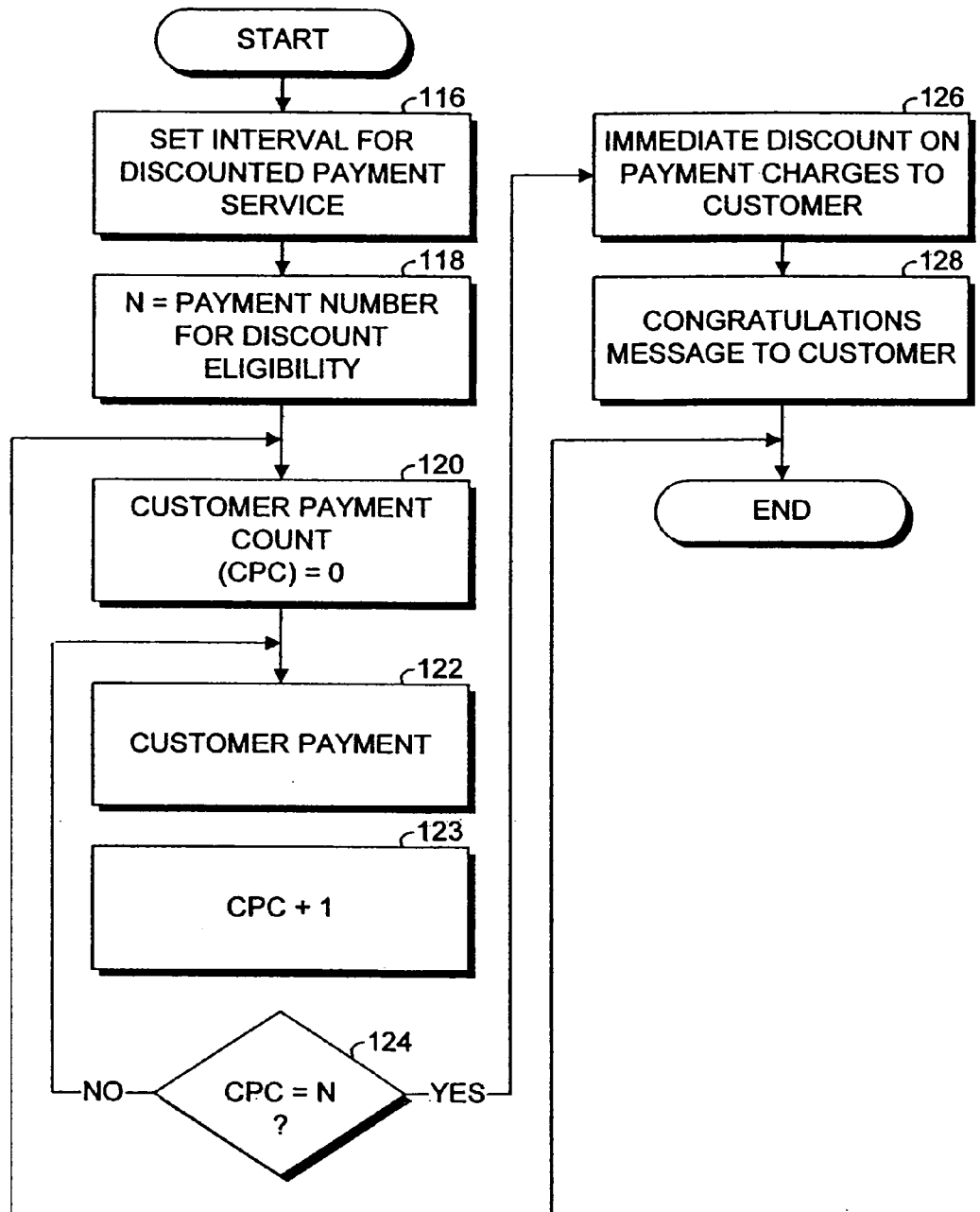
FIG. 7 is a flow chart for providing an automatic repeat customer discount.

FIG. 7 shows a procedure for rewarding repeat customers with discounts. At 116 the interval for the discounted payment service is set and a number of repeat transactions N is set at 118 in order to qualify for a discount. A customer payment count (CPC) is set to zero at 120. A customer payment is made at 122 and increments the customer payment count (CPC+1) at 123. At a decision box 124 the customer payment count is compared to the number of payments required for discount eligibility (CPC=N?). If negative, the procedure returns to the customer payment step 122. If affirmative, an immediate discount can be provided on the current payment charge to the customer at 126. A congratulatory message to the customer is printed at 128, for example on the receipt.

Figure 8:
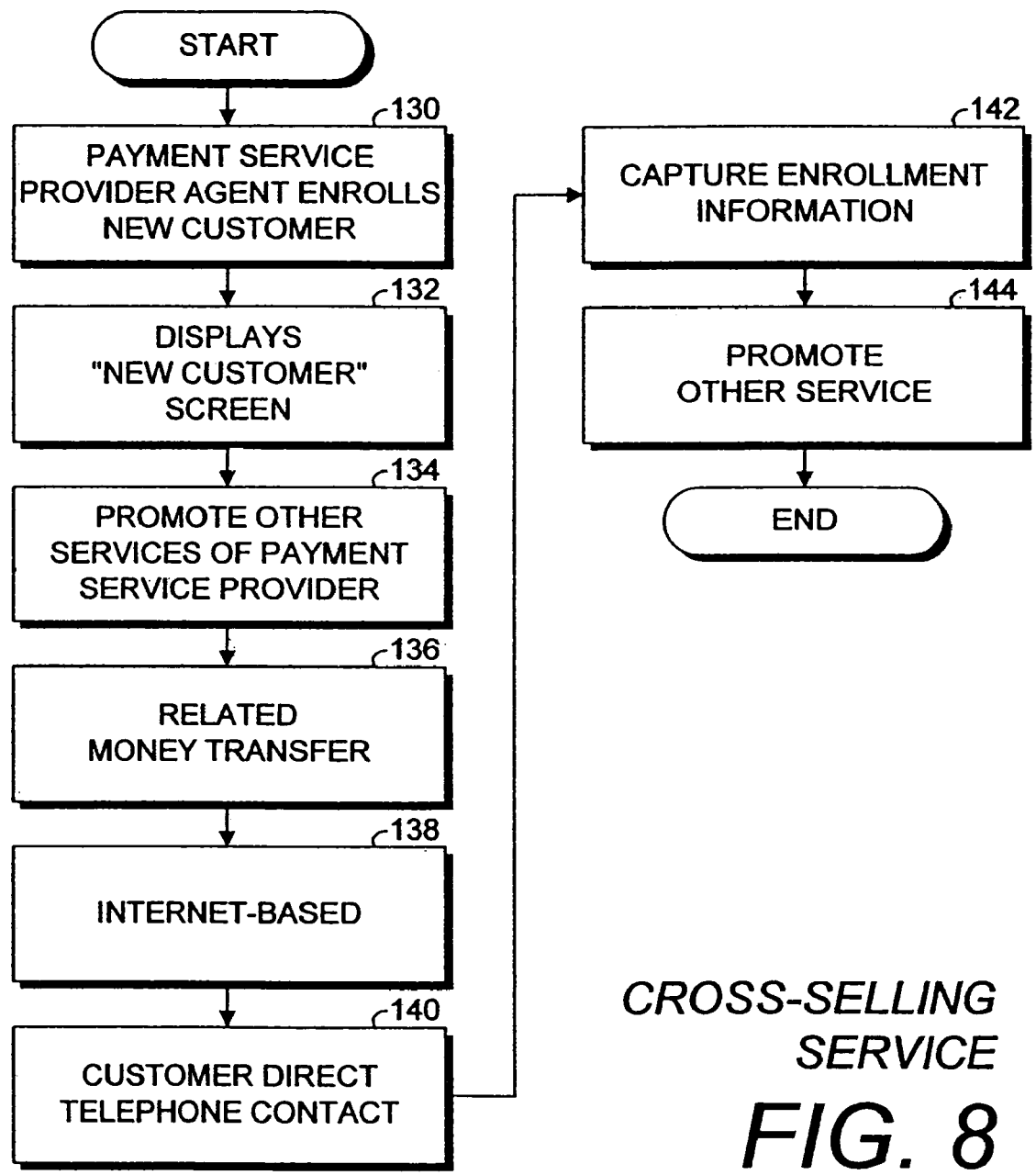
FIG. 8 is a flow chart for cross selling services of the client.

FIG. 8 shows a cross-selling methodology which commences with the step of a new customer enrollment at 130. A new customer screen is displayed at 132 for purposes of promoting other services of the payment service provider at 134. For example, other related money-transfer services of the payment service provider 4 can be promoted to the customer 6 at 136. Internet-based services can be promoted at 138 and direct telephone contact services can be promoted at 140. The enrollment information can be captured at 142, and can reflect the services utilized by the customer. Still other services can be promoted at 144.

Figure 9:
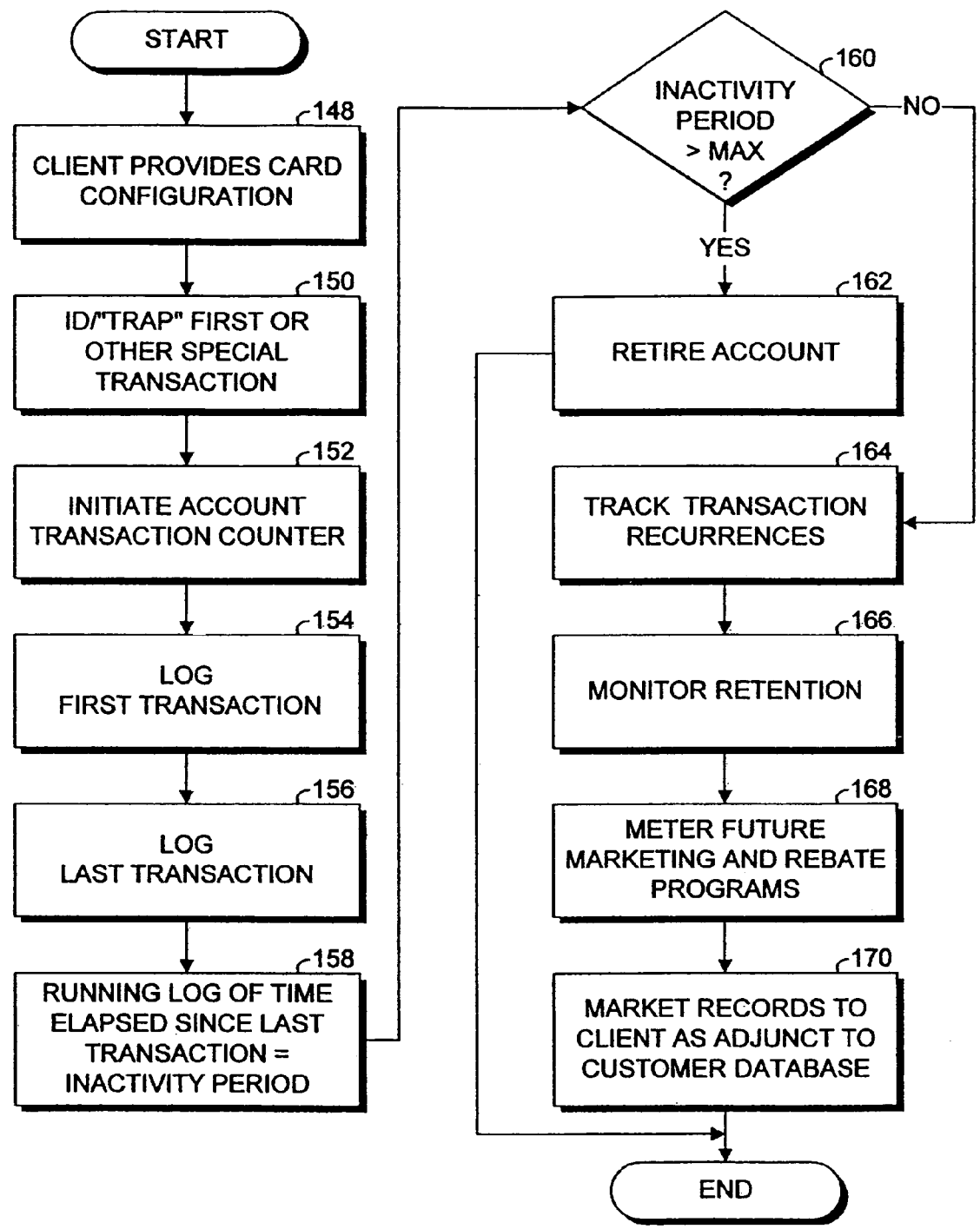
FIG. 9 is a flow chart for metering transactions involving accounts.

FIG. 9 shows a transaction metering procedure which commences with the client 8 providing the card configuration at 148. An ID trap occurs at 150 whereby a first or other special transaction is identified for special handling. An account transaction counter is initiated at 152 and a first transaction is logged at 154. A last transaction is logged at 156 and a running log of time elapsed since the last transaction (corresponding to an inactivity period) is maintained at 158. At decision box 160 a determination is made if the inactivity period has exceeded the maximum allowable period. If affirmative, a retire account step occurs at 162 and the sub-routine ends. If negative, the sub-routine continues to track transaction recurrences at 164 and monitors retentions at 166. Future marketing and rebate programs are metered at 168 and market records are provided to the client at 170 based upon the data received in the above steps. The market records can be used as an adjunct to the client's customer database.

Figure 10:
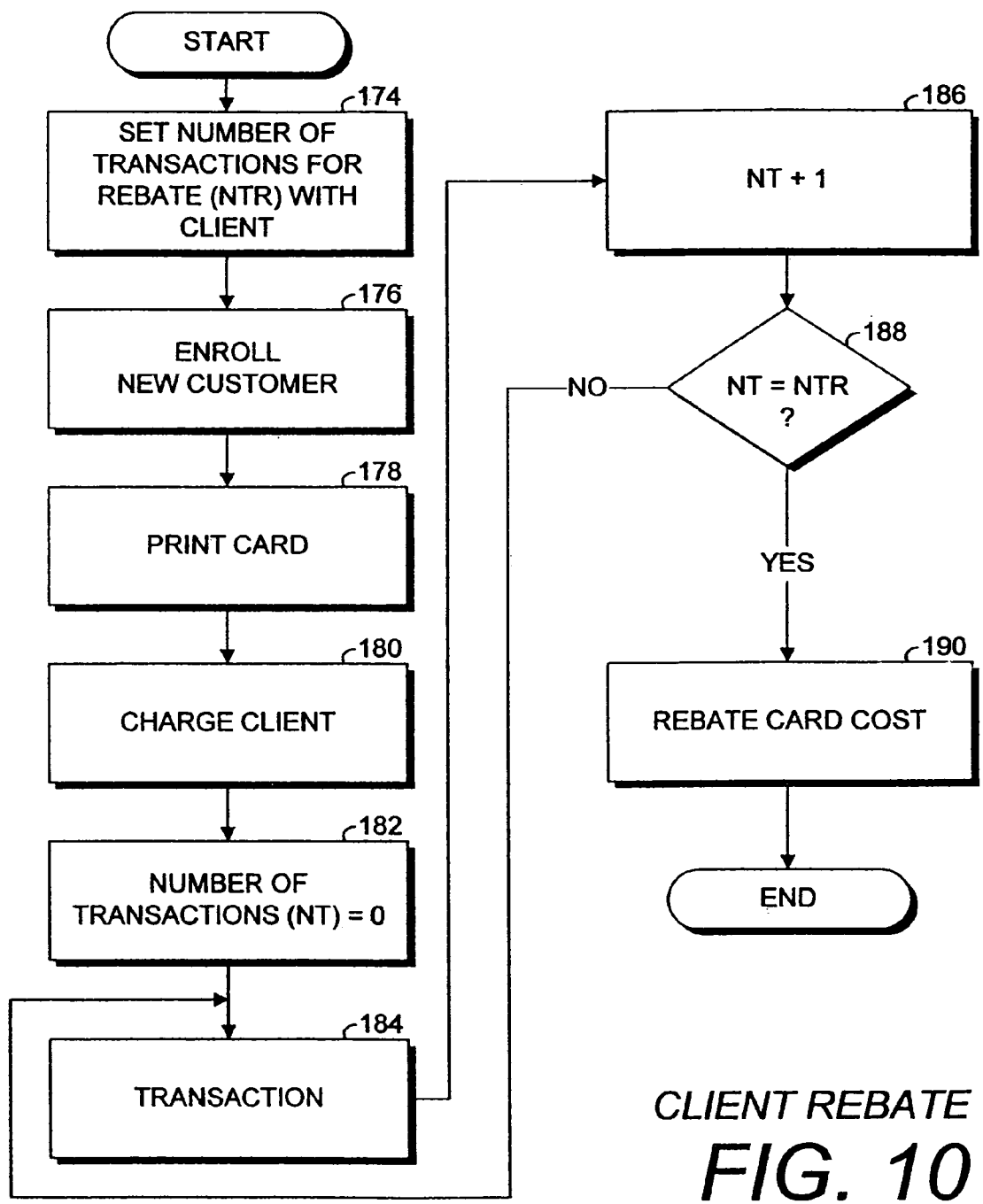
FIG. 10 is a flow chart for providing rebates to clients.

FIG. 10 shows a client rebate routine wherein a number of transactions required for rebate eligibility is set with the client at 174 (NTR). New customers are enrolled at 176, cards are printed at 178 and the clients 8 are charged at 180.

The number of transactions (NT) is initialized to zero at 182, a transaction occurs at 184 and increments the number of transactions (NT+1) at 186. At decision box 188 a determination is made if NT=NTR? If affirmative, the cost of the card is rebated to the client at 190. If negative, the routine returns to the transaction step for the next increment.

Figure 11:
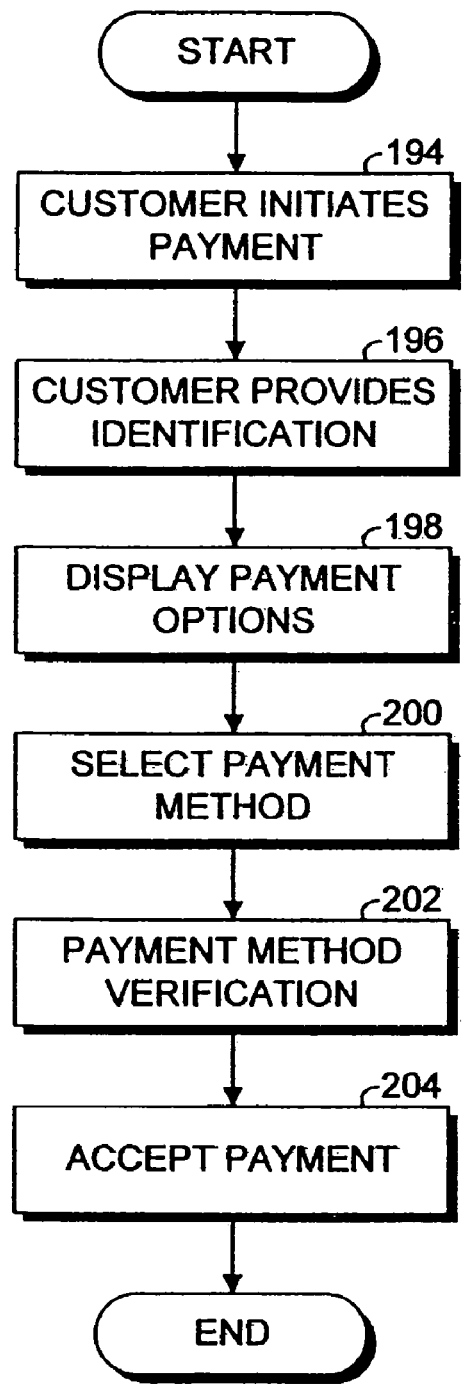
FIG. 11 is a flow chart for alternative payment methods.

FIG. 11 shows a methodology for making payments using various options. The customer initiates a payment at 194 and provides his or her ID at 196. Various payment options are displayed, and can include negotiable instruments (e.g. checks, cashier checks, money orders, etc.), credit cards, debit cards, etc. A payment method is selected at 200 and is verified at 202 to ensure that good (i.e., collectable) funds are available from the customer 6 utilizing the selected payment method. The payment is accepted at 204.

Figure 12:
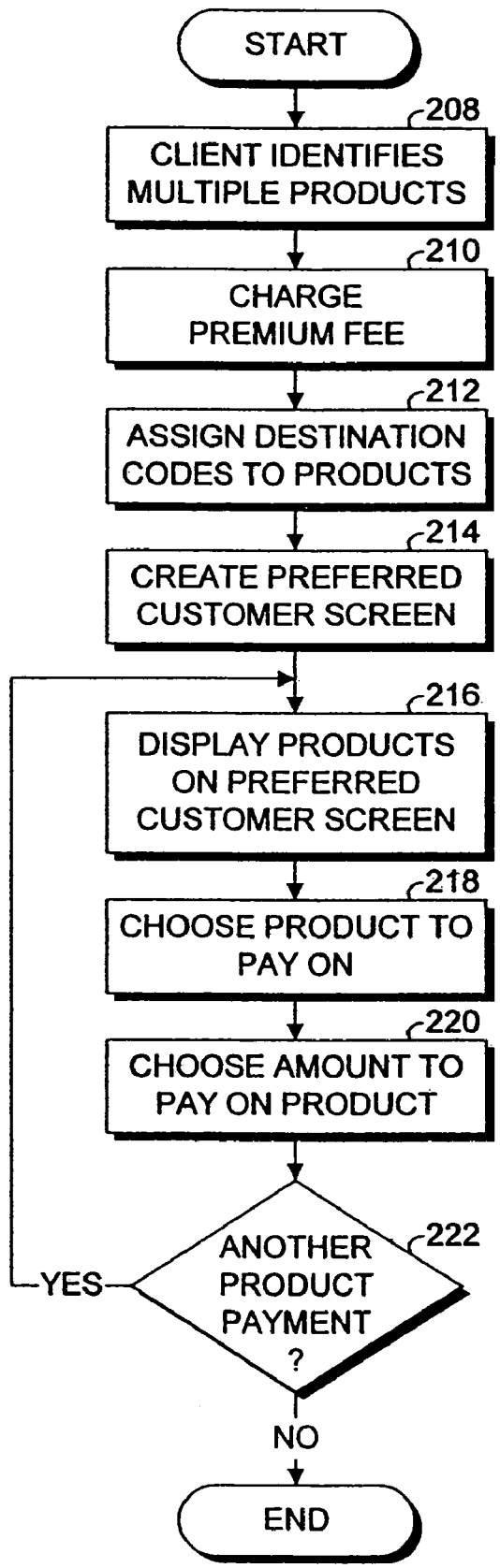
FIG. 12 is a flow chart for additional product support.

An additional product support procedure is shown in FIG. 12 and commences with the client 8 identifying multiple products to be supported at 208. For example, a telecommunications client might provide various products such as prepaid dialtone, prepaid cellular, prepaid internet access and insurance. All of these products can be provided on a single card. A premium fee can be charged by the payment service provider 4 at 210. Destination codes can be assigned to the client's various products and a preferred customer screen created for displaying same at 212, 214 respectively. The client's products can be displayed on the preferred customer screen at 216 whereby the customer can choose a product to pay on at 218. At 220 the customer chooses the amount to pay on the chosen product. At decision box 222 the customer has the option of choosing another product to pay on. If affirmative, the preferred customer screen with the multiple products is displayed again. Otherwise, the subroutine ends.

Figure 13:
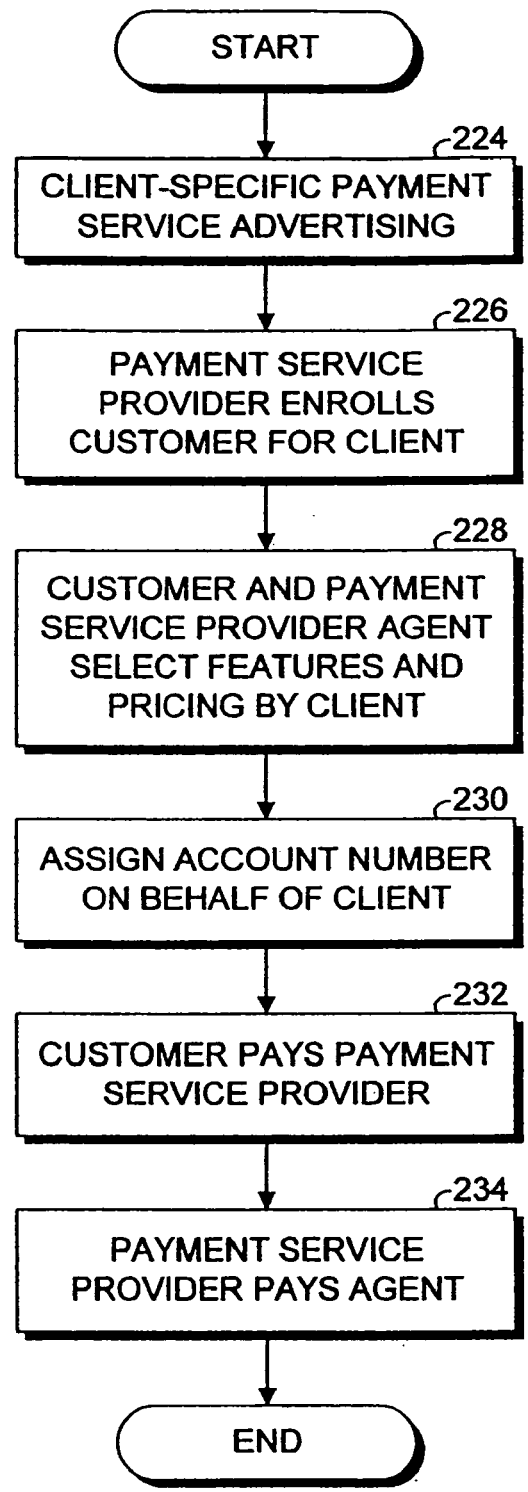
FIG. 13 is a flow chart for client-specific enrollment.

FIG. 13 shows a client-specific enrollment methodology, as contrasted with a generic enrollment procedure commencing with client-specific payment service advertising which identifies the payment service provider 4 and directs potential customers to its agent network 14. The payment service provider agent enrolls a customer on behalf of the client at 226. The customer is typically either a present or prospective customer for the client's goods or services and has been directed to the payment service provider's agent network 14 as a way of paying for same. At 228 the customer and the payment service provider agent select the features and pricing desired by the customer for the client's products. An account number can optionally be assigned on behalf of the client by the payment service provider agent at 230. The payment service provider is paid by the customer at 232, and in turn pays the agent at 234.

Figure 14:
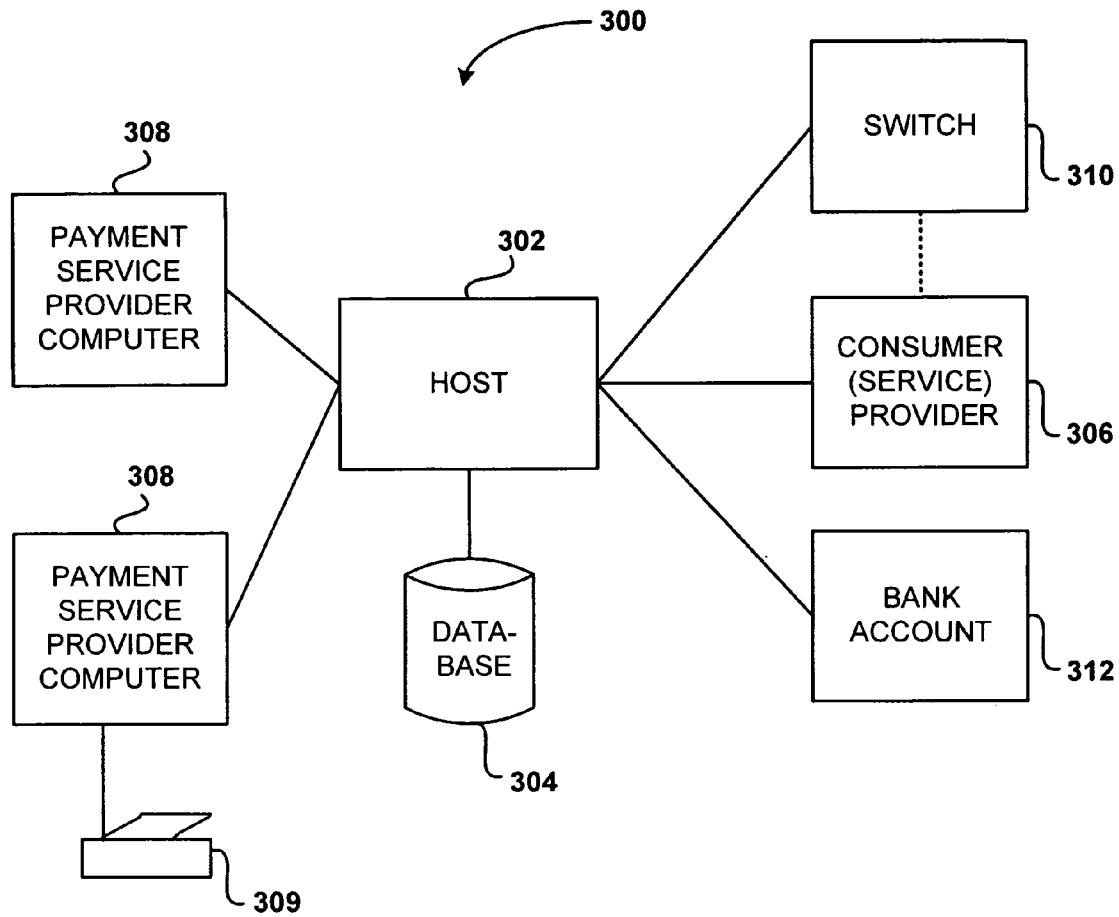
FIG. 14 is a schematic diagram of one embodiment of a payment system according to the invention.

FIG. 14 schematically illustrates one payment system 300 that may be used to facilitate payments made to purchase goods or services. Central to payment system 300 is a host computer 302 that may have one or more associated databases 304. Host 302 facilitates data transfer between one or more consumer providers 306 and one or more payment service provider computers 308 or terminals. Host 302 may be any type of computer capable of communicating with other types of communication devices or computers. For example, host 302 may be a mainframe computer, such as those available from Tandem, a server computer, or the like.

Consumer providers 306 offer goods or services for sale to consumers. In some cases, consumer providers 306 are incapable of or choose not to accept payments directly from consumers. For example, a consumer may have bad or no credit and may therefore not qualify to receive a good or service on credit. In other cases, consumer providers may simply find it too inconvenient to take cash payments from multiple consumers.

For whatever reason, consumer providers may choose to utilize a payment system to collect payments on their behalf. In such cases, consumer providers 306 issue unique identifiers which are associated with a good or service and are electronically transmitted to host 302 where they may be stored in database 304. These identifiers may be associated with specific consumers. For example, when requesting a good or service, the consumer provider may create an account and an identifier is associated with the account and issued to the consumer. Alternatively, the identifiers may be associated with a service, but not to any given consumer. For example, the identifiers may associated with some type of stored value, such as phone time, dollars and the like. This value may be redeemed simply by presenting the identifier to the consumer provider.

On the payment side, payments may be made to any payment service provider location. Payment may be made in a variety of forms, including those described in connection with FIG. 1. The payment information is entered into computer 308 that may comprise any device capable of communicating with host 302. For example, computers may comprise a traditional desktop PC as is known in the art, a point of sale device such as described in copending U.S. patent application Ser. No. 09/634,901, entitled "POINT OF SALE PAYMENT SYSTEM," filed Aug. 9, 2000 and U.S. Prov. Appl. No. 60/147,899, entitled "INTEGRATED POINT OF SALE DEVICE," filed Aug. 9, 1999, previously incorporated by reference, and the like.

Computers 308 communicate with host 302 in order to obtain the identifiers and any associated payment information. For example, when ready to make a payment, a consumer may present their identifier which is entered into computer 308. This information is transmitted to host 302 where any relevant information regarding the required payment is transmitted back to computer 308. For instance, computers 308 may present a screen with the identifier and the amount of payment required to receive a good or service from the consumer provider. In some cases, the consumer may not yet have an identifier and may simply request to purchase a good or service from a consumer provider. For instance, the consumer may wish to purchase phone time from a certain phone company. In such cases, the consumer makes a request to purchase phone time from a certain provider. This information is entered into computer 308. The computer 308 may then display payment options for that provider as received from host 302. For example, payment in increments of $5, $10, $25 and $50 may be accepted. Upon receipt of payment, an identifier is issued to the consumer. Conveniently, a printer 309 may print a receipt with the identifier.

At the time of payment, other funds may also be collected. For example, the payment service provider may charge and collect a fee for its services. As another example, applicable taxes may be calculated and collected. These taxes may be calculated by host 302 in combination with database 304 that may include tax tables for various locations throughout the country. When tendering payment, the consumer may provide information on his residential address, such as a zip code. This information is transmitted to host 302 that performs a look-up in database 304 to determine the appropriate tax rate. Host 302 then computes the tax and sends the tax information to computer 308. The payment amount, taxes, and any service fees may then be displayed to the consumer on a display screen.

Upon tendering payment, an electronic record of the payment along with the associated identifier is created and transmitted to host 302 where it may be stored in database 304. This payment information may also be transmitted to consumer provider 306 so that the good or service may be provided to the consumer. If the services relate to telecommunications, the payment information may also be sent from host 302 to a switch 310 to permit the telecommunications service to be promptly provided. For example, if the consumer purchased cell phone time, the consumer provider's switch would receive the payment information and add time to the phone, typically before the consumer leaves the location where payment is made. Of course, the instructions to the switch could also be sent from the consumer provider as well. Receipt of payment information may also trigger the providing of other services, such as service activation, shipping of order goods, and the like. In some cases, the service may not be activated or the order good provided until the consumer contacts the consumer provider and gives the issued identifier. For example, phone time may be purchased, but not activated until the phone company is contacted and given the identifier. When the good is a stored value, this record may be stored in database 304 and transmitted to consumer provider 308. When a good or service is ordered from provider 308, the identifier is presented and the stored value account is debited for the purchase price.

Host 302 may also be used to electronically transfer the payment along with any collected taxes to the consumer provider. This may conveniently occur by an ACH transfer of funds into a bank account 312 of the consumer provider. This may occur upon receipt of the payment information by host 302 or by batch mode at specified times. A record of the deposit may separately be transmitted to consumer provider 306. Host 302 is configured to communicate with a separate ACH system that debits the account of the consumer and credits the account of the consumer provider as is known in the art.

Hence, system 300 provides consumers with an easy way to purchase goods or services. Further, such goods and services are provided in an efficient manner and provides rapid payment to the consumer provider.

Another feature of system 300 is that consumer provider 306 may also be provided with access to host 302. In this way, the consumer provider may do a look-up to see if a payment was posted correctly, to see the status of a payment or the like. Further, regular updates may be sent from consumer provider 306 to host 302 so that consumer accounts may be kept current.

Figure 15:
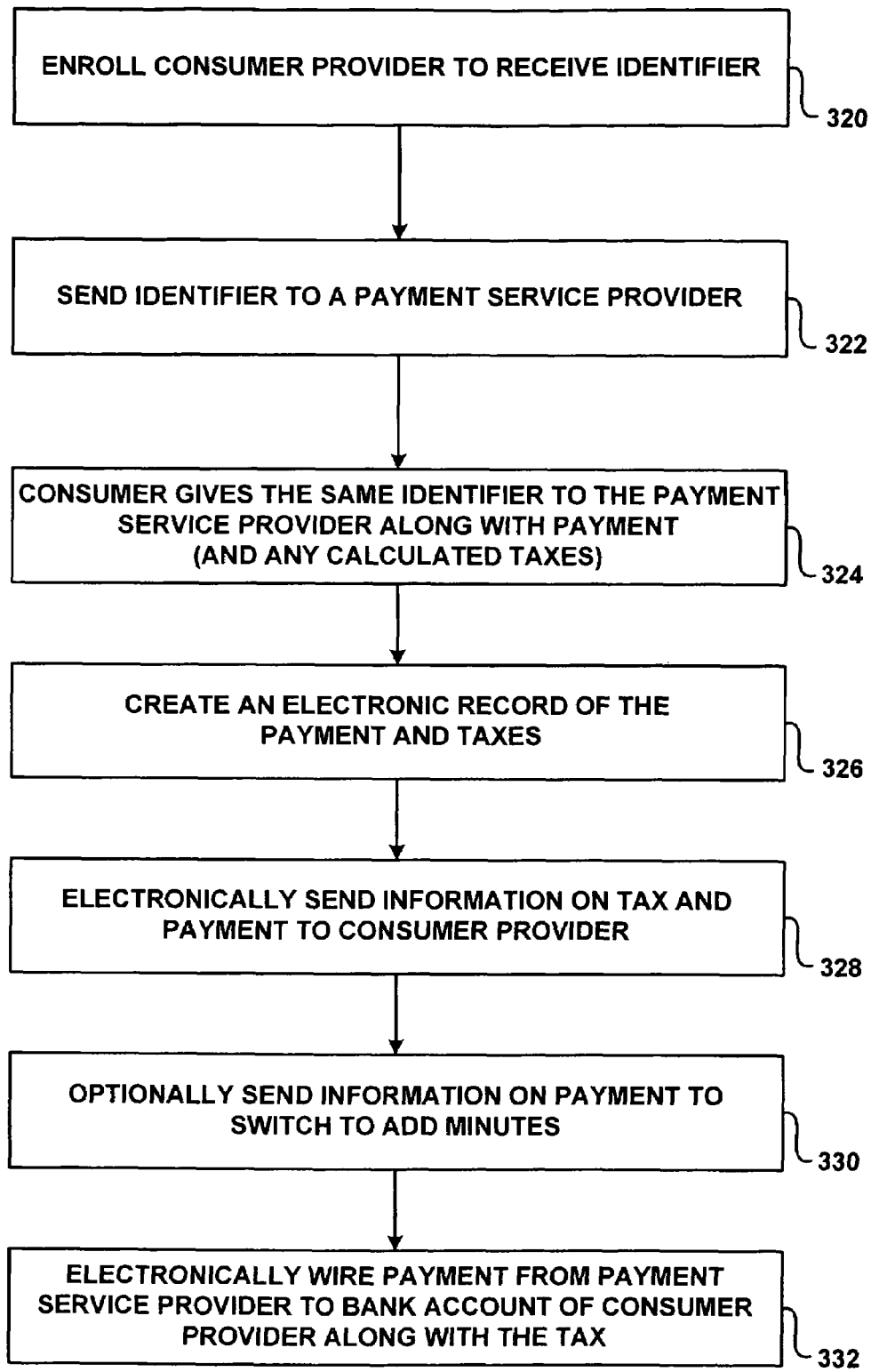
FIG. 15 is a flow chart illustrating one method for paying for a good or service according to the invention.

Referring now to FIG. 15, one method for pre-paying for a good or service will be described. Initially, a consumer enrolls with a consumer provider as shown in step 320 to order a good or a service. For example, services that may be ordered include phone service, including phone minutes, a stored value service, and the like. Goods that may be purchased include essentially any type of good including retail items, clothing, furniture, sporting goods, cosmetics, toiletries, durable goods, vehicles and the like.

When a request is made for a purchase, an electronic account may be created to record the requested item and the price along with any other relevant information. A unique identifier is also included in the record to uniquely identify the request. This identifier may be any type of identifier as previously described, including phone numbers, order numbers, credit card numbers, social security numbers and the like. The consumer is presented with this number along with instructions as to where a payment may be made. For example, the consumer provider may access a payment service provider locator to tell the consumer the closest location where a payment may be made.

In step 322, the record is electronically sent from the consumer provider to the host computer of the payment service provider. When ready to make the payment, the consumer goes to one of the locations of the payment service provider and gives the unique identifier as shown in step 324. This identifier is entered into a terminal and transmitted to the host where the record may be accessed and sent back to the terminal. With the record, the terminal may display the payment due along with any fees. Also, a computed tax may also be displayed.

Upon tendering of payment, this information is entered into the terminal to create an electronic record of the payment as shown in step 326. This information is then sent to the consumer provider via the host computer as shown in step 328. In the case of a telecommunications service, this information may also be sent to a switch as shown in step 330. This information is used by the switch to immediately add time to a cell phone account or provide other telecommunications features rendered by the switch.

As shown in step 332, the payment (along with any taxes) is electronically wired to a bank account of the consumer provider. Upon receipt of notification of payment, the consumer provider may fulfill the order (if not already automatically fulfilled). For example, if a good was purchased, the good may be pulled from inventory and shipped to the consumer or other recipient. As another example, a stored value account may be credited upon notification of payment.

Figure 16:
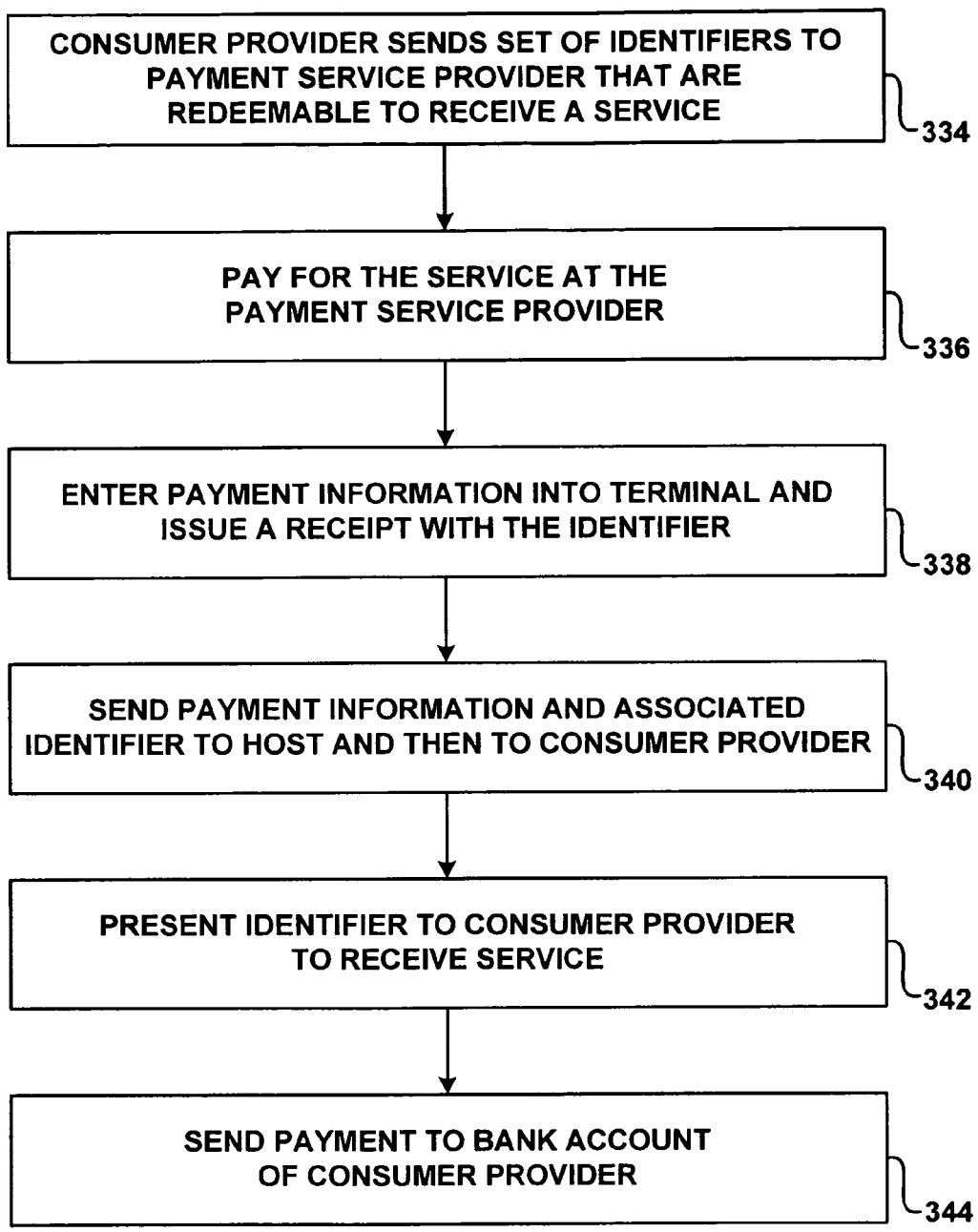
FIG. 16 is a flow chart illustrating another method for paying for a good or service according to the invention.

Referring to FIG. 16, another payment method will be described. This method is particularly useful in prepaying from some type of stored value card, without requiring the issuance of a physical card. In this way, an identification number may be used to "store" a stored value. For example, a consumer may purchase a stored value of phone time that is associated with an identifier. This identifier may then be presented to phone company to add calling time to a phone.

The process begins at step 334 where a consumer provider sends identifiers to a payment service provider. These may be electronically transmitted to a host computer and stored in a database. The identifiers are redeemable by consumers to receive a service. For example, the identifiers may be redeemed to receive a certain number of minutes on a phone, to purchase goods at retail, over the web, over the phone, or the like. When ready to pay for such goods or services, the consumer contacts the payment service provider and requests to pay for a certain good or service as shown in step 336. For example, the consumer may request to purchase a $20 calling card, a $20 retail card or the like. Using a terminal, the host is contacted to see if such a good or service is available. If so, payment is made and payment information is entered into the terminal. Also one of the identifiers is associated with the payment, and a receipt is issued to the consumer with the identifier as shown in step 338. The payment information and associated identifier are sent from the terminal and to the host where it may be transmitted to the consumer provider as shown in step 340.

When ready to receive the service, the consumer simply presents the identifier to the consumer provider as shown in step 342. For example, the consumer may phone a cell phone company and give the identifier to have phone time added to a cell phone.

As shown in step 344, the host computer may also electronically send the payment to a bank account of the consumer provider. This may be accomplished by an ACH transfer as is known in the art.

Figure 17:
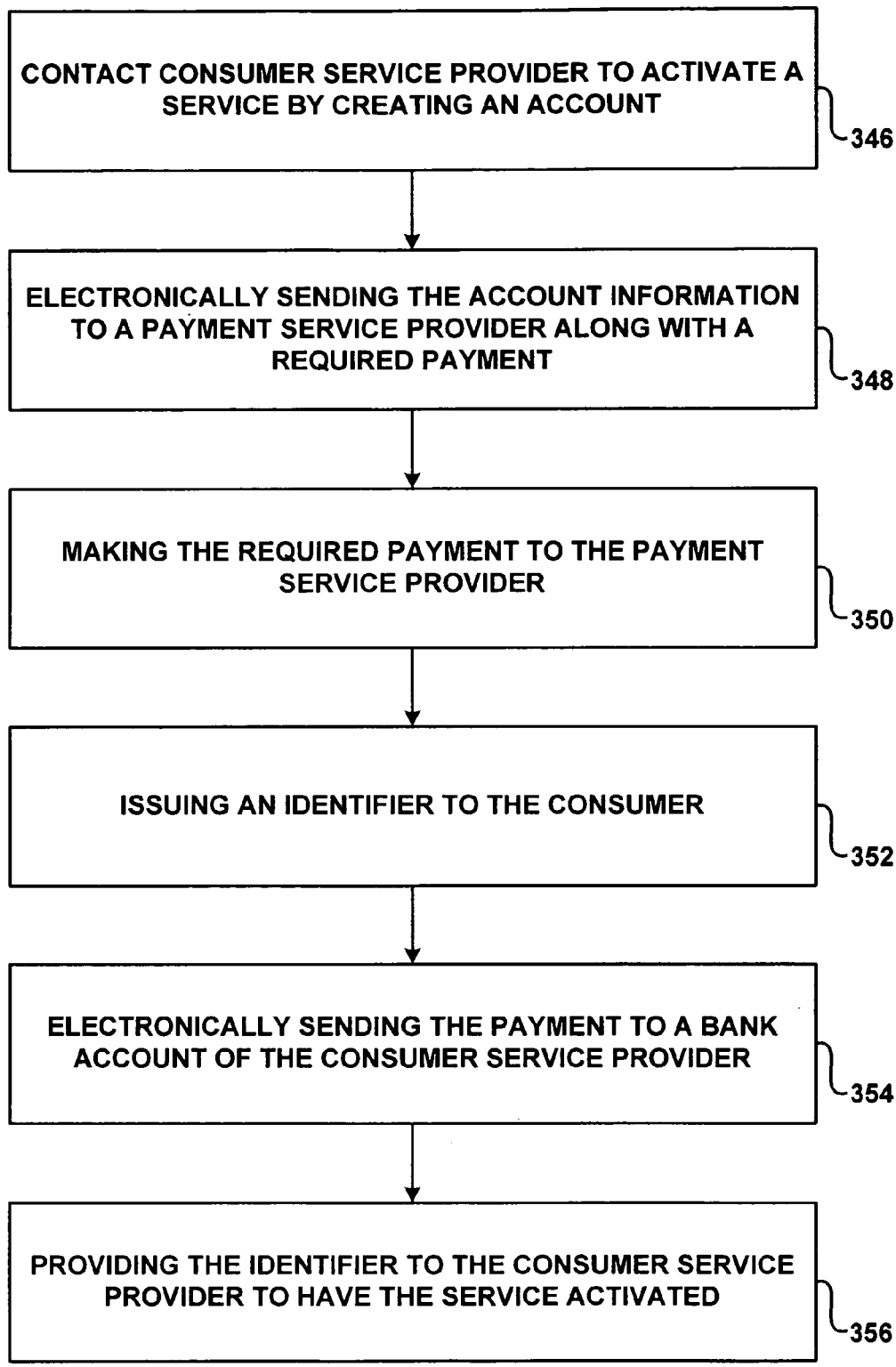
FIG. 17 is a flow chart illustrating a service activation method according to the invention.

The invention may also be used to activate a service, such as phone service, utility service or the like. One example of such a process is illustrated in FIG. 17. Initially, a consumer contacts a service provider to request a service as shown in step 346. An account is set up with the consumer service provider and a record is created containing the information needed to provide the service. To pay for the service, the consumer is instructed to contact a payment service provider.

At least some of this account information is sent to the payment service provider as shown in step 348. For example, the account information may be sent to a host computer and stored in a database. This may include the amount of payment needed to have the requested service activated.

At step 350, the consumer contacts the payment service provider and requests that a payment be made to the consumer service provider. The account information may be accessed from the host computer by using a terminal. The display screen may display the appropriate account information along with the required payment and any service fee. The consumer then makes the payment, and an identifier is issued to the consumer as shown in step 352. For example, a receipt may be printed with the identifier. Conveniently, the identifier may be assigned to the account by the consumer service provider when the account is created.

At step 354, the payment is electronically sent to a bank account of the consumer provider. This may be an ACH transfer using the host computer. At step 356, the payment information, along with the identifier, is also sent to the consumer provider. The consumer service provider may then activate the requested service.

In a modification to the method of FIG. 16, the invention may also be used to issue physical cards having a stored value. These cards may be traditional debit cards having an account number and personal identification number (PIN). These cards may be accepted anywhere where traditional debit cards are used, such as those employing the use of a debit network where ACH transfers are processed.

In such cases, the consumer service provider provides the payment service provider with account numbers and PINs. These are associated with physical cards and the account numbers may be embossed on the cards. When one of these cards are purchased, the stored value is stored by the host computer. When a purchase is made, the request is sent to a debit system that is capable of processing ACH transactions. This debit system contacts the host computer to verify the account and provide the appropriate debit to the account. Hence, once the account balance reaches zero, no more purchases may be made without contacting the payment service provider to reload the account. In this way, a card is only good for the amount of prepayment. Further, the card may only be used with the PIN, thereby reducing the chances of fraudulent purchases.

The invention may also permit stored value records without issuing physical cards. In such cases, the payment service provider may generate its own set of identifiers and store them in a database. A consumer may then make a payment to the payment service provider and be issued one of the identifiers. The amount of payment is then stored in the database as a stored value record. The consumer may then use this identifier to pay for goods or services from any merchant that will accept such an identifier. For example, the identifier may be a routing number that is recognized buy an ACH transfer system. In such cases, the identifier may be used to debit the stored value account and to pay the merchant using an ACH transfer.

It is to be understood that while certain forms of the present invention have been illustrated and described herein, it is not to be limited to the specific forms or arrangements of steps and components described and shown.

What is claimed is:

1. A method for prepaying for a stored value account maintained by a payment service provider in order for an unbanked consumer to purchase goods or services from a consumer provider using the stored value account rather than a bank account of the consumer, the method comprising:

receiving at a host computer of a payment service provider a set of identifiers from a consumer provider that are associated with stored value accounts of the consumer provider, wherein the identifiers comprise routing numbers recognized by an Automated Clearing House (ACH) transfer system;

at a terminal system, calculating a payment amount that comprises a stored value amount, a service fee and a tax;

entering into the terminal system payment information that includes the payment amount and transmitting the payment information to the host computer;

at the host computer, associating the payment information with one of the identifiers;

transmitting from the host computer to the terminal system the identifier;

printing a receipt having at least some of the payment information and the identifier;

electronically transmitting from the host computer to the consumer provider the payment information;

performing an ACH transfer request from the host computer to electronically deposit at least some of the payment amount in a bank account of the consumer provider; and debiting the stored value account using an ACH transfer based on presentment of the identifier to the consumer provider.

2. A method as in claim 1, wherein the payment information is transferred electronically from the terminal system to the host computer.

3. A method as in claim 1, wherein receipt of the payment information record is used to activate the stored value account.

4. A method as in claim 3, wherein the stored value account includes phone time.

5. A method as in claim 1, wherein the payment amount is determined by the consumer provider.

6. A payment system for a consumer to purchase goods or services from a consumer provider using a stored value account maintained by a payment service provider rather than using a consumer bank account, comprising:

a host computer; and a database associated with the host computer, the database having a record of a set of identifiers that are associated with stored value accounts of a consumer provider, wherein identifiers comprise routing numbers recognized by an Automated Clearing House (ACH) transfer system;

wherein the host computer is configured to receive a record containing one of the identifiers along with information on a payment, to send information from the record to the consumer provider, and to electronically facilitate the sending of the payment to a bank of the consumer provider using an ACH transfer;

at least one terminal having a processor that is capable of communicating with the host computer, and wherein the terminal is configured to calculate a payment amount that comprises a stored value amount;

wherein the host computer is further configured to associate the payment information with one of the identifiers, to transmit the identifier to the terminal, to electronically transmit to the consumer provider the payment information, and to perform an ACH transfer request to electronically transmit at least some of the payment amount in a bank account of the consumer provider; and a printer coupled to the material to print a receipt showing the payment and the identifier.

7. A method for prepaying for a service using stored value accounts maintained by a payment service provider, in order for an unbanked consumer to purchase goods or services from a consumer provider using the stored value account rather than a bank account of the consumer, the method comprising:

receiving a set of identifiers from a consumer service provider that are associated with a stored value account, that are presentable to the consumer service provider, that are used to add value to a stored value account maintained by the payment service provider, and that comprise routing numbers recognized by an Automated Clearing House (ACH) transfer system;

receiving a request to pay for the service along with a payment;

associating the payment with one of the identifiers;

performing an ACH transfer request to electronically transmit at least some of the payment amount into a bank account of the consumer service provider;

creating an electronic record of the payment along with the associated identifier; and issuing a receipt that includes the identifier, wherein the identifier is presentable by the consumer to the consumer service provider to receive the service.

8. A method as in claim 7, further comprising entering information on the payment into a terminal system having a processor and that contains a record of the associated identifier.

9. A method as in claim 8, further comprising electronically sending the payment information and the associated identifier from the terminal system to a host computer.

10. A method as in claim 9, further comprising sending the payment information and the associated identifier from the host computer to the consumer service provider.

11. A method as in claim 10, further comprising sending an electronic report to the consumer showing the amount of payment and a calculated tax associated with the payment.

12. A method as in claim 10, further comprising establishing a communication link between the terminal system and the host computer, and wherein the host computer is configured to calculate the tax based on the location of the consumer provider.

13. A method as in claim 10, further comprising displaying the amount of the tax at the terminal system.

14. A method as in claim 7, wherein each identifier is associated with a fixed payment amount.

15. A method as in claim 7, wherein the receipt comprises a sheet of paper having the identifier printed thereon.

16. A method as in claim 7, wherein the stored value account comprises phone service, and further comprising adding time to the phone service upon presentment of the identifier to the consumer service provider.

* * * * *

UNITED STATES PATENT AND TRADEMARK OFFICE
CERTIFICATE OF CORRECTION

PATENT NO. : 7,315,843 B2 Page 1 of 1
APPLICATION NO. : 11/479142
DATED : January 1, 2008
INVENTOR(S) : Diveley et al.

It is certified that error appears in the above-identified patent and that said Letters Patent is hereby corrected as shown below:

Column 5, line 3, delete "finds", and insert --funds--.

Signed and Sealed this

Twentieth Day of May, 2008

JON W. DUDAS
*Director of the United States Patent and Trademark Office*